(12) United States Patent
Gerald, II et al.

(10) Patent No.: US 7,887,970 B1
(45) Date of Patent: Feb. 15, 2011

(54) ALUMINUM OXYHYDROXIDE BASED SEPARATOR/ELECTROLYTE AND BATTERY SYSTEM, AND A METHOD OF MAKING THE SAME

(75) Inventors: Rex E. Gerald, II, Brookfield, IL (US); Robert J. Klingler, Glenview, IL (US); Jerome W. Rathke, Homer Glen, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 1232 days.

(21) Appl. No.: 11/498,993

(22) Filed: Aug. 2, 2006

Related U.S. Application Data

(60) Provisional application No. 60/704,651, filed on Aug. 2, 2005.

(51) Int. Cl.
*H01M 2/18* (2006.01)

(52) U.S. Cl. .................................. 429/486; 429/251
(58) Field of Classification Search ................ 429/479, 429/481, 483, 486, 251
See application file for complete search history.

(56) References Cited

U.S. PATENT DOCUMENTS 3,784,410 A * 1/1974 Bergum et al. .............. 429/152
6,472,100 B1 * 10/2002 Maruta ..................... 429/218.1

* cited by examiner

*Primary Examiner*—Jennifer Michener
*Assistant Examiner*—Monique Wills
(74) *Attorney, Agent, or Firm*—Mark C. Lang; Brian J. Lally; John T. Lucas

(57) ABSTRACT

The instant invention relates a solid-state electrochemical cell and a novel separator/electrolyte incorporated therein. The invented electrochemical cell generally comprising: a unique metal oxyhydroxide based (i.e. AlOOH) separator/electrolyte membrane sandwiched between a first electrode and a second electrode. The novel separator/electrolyte comprises a nanoparticulate metal oxyhydroxide, preferably AlOOH and a salt which are mixed and then pressed together to form a monolithic metal oxyhydroxide-salt membrane.

14 Claims, 12 Drawing Sheets

Assuming:
L = 0.025cm
r = 0.6cm
R = 232.8Ω

$\sigma = L/(\pi r^2 * R)$
= 0.1 mS/cm

Assuming:
L = 0.025cm
r = 0.6cm
R = 232.8Ω

σ = L/(πr²*R) = 0.1 mS/cm

The dependence of the overall conductivity of LiI: $Al_2O_3$ on the specific surface of $Al_2O_3$ (Poulsen and Møller, 1985).

$9.5 \times 10^{-5}$ S/cm is the measured conductivity; it is more than 6 times greater than predicted.
$1.55 \times 10^{-5}$ S/cm would be the predicted conductivity for our material based on surface area.

ALUMINUM OXYHYDROXIDE BASED SEPARATOR/ELECTROLYTE AND BATTERY SYSTEM, AND A METHOD OF MAKING THE SAME

RELATION TO PREVIOUS PATENT APPLICATIONS

The present non-provisional patent application is related to, and claims priority of, U.S. Provisional Patent Application No. 60/704,651 filed on Aug. 2, 2005, by instant inventors, which is hereby incorporated by reference in its entirety.

U.S. GOVERNMENT RIGHTS

The United States Government has rights in this invention pursuant to Contract No. W-31-109-ENG-38 between the U.S. Department of Energy and the University of Chicago, representing Argonne National Laboratory.

TECHNICAL FIELD

The invention relates to a unique, solid state metal oxyhydroxide based separator/electrolyte. More specifically one preferred embodiment of the invention relates to a unique aluminum oxyhydroxide (i.e. AlOOH) based separator/electrolyte and battery system, and method of making the same.

BACKGROUND OF THE INVENTION

Increased use of consumer electronics such as cellular telephones, laptop computers and other portable devices, and the development of new technologies like electric vehicles (EV) has increased the demand for compact, durable, high capacity batteries. This demand is currently being filled by a variety of battery technologies including traditional lithium-ion batteries. However, lithium-ion batteries with liquid electrolytes pose leakage and flammability hazards. In addition, the plastic separator used with liquid electrolytes can be punctured by lithium dendrites. Lithium-ion batteries that attempt to obviate these problems with semi-solid polymer electrolytes are susceptible to short circuits through internal contacts between protruding rough-surfaced electrodes. Thicker polymer electrolyte films are not a suitable solution because the inherent low ion conductivity of known polymer electrolytes is limiting. Semi-solid and solid-state electrolytes are desirable because they provide inherent advantages in the fabrication of consumer batteries in a wide variety of shapes and sizes that are thinner, safer and more environmentally friendly.

Lithium polymer electrolytes have received considerable interest for use in solid-state batteries. These electrolyte systems are complex materials composed of amorphous and crystalline phases. It has been known since 1983 that the ion motion in polymer electrolyte occurs predominantly in the amorphous phase. Accordingly, the conventional approach to improving ionic conductivity has been to investigate conditions that either decrease the degree of crystallinity or increase the segmental motion of the polymer matrix. However, despite significant improvement, the use of modern lithium-ion batteries employing polymer electrolytes is still limited; polymer electrolytes have inherently low ion conductivities and are too soft to prevent puncture and shorting by lithium dendrites.

Some of the first true solid-state batteries were developed by Duracell in the 1970s using aluminum oxide ($Al_2O_3$) powder and lithium iodide salt (LiI) as the electrolyte material. See, U.S. Pat. No. 4,397,924 issued to Rea on Aug. 9, 1983 (Rea '924). The solid alumina-based ($Al_2O_3$) electrolytes provided two orders of magnitude greater conductivity than polymer electrolytes and are hard materials that are not subject to puncture by lithium dendrites. Lithium cations traverse the alumina matrix by a hopping mechanism instead of the mechanism of segmental rearrangements effective in polymer electrolytes. In the alumina/LiI electrolyte, lithium ions travel across the surfaces of alumina particles by hoping from oxide oxygen to oxide oxygen on the amorphous alumina surface. However, Duracell and other manufactures have virtually abandoned this technology. (Kluger K, Lohrengel M, Berichte Der Bunsen-Gesellschaft-Physical Chemistry Chemical Physics, 95 (11): 1458-1461 NOVEMBER (1991)). Poor particle packing, mechanical vibrations and shocks can diminish effective interparticle contacts that can result in reduced numbers of pathways for ion conduction. Large metal oxide-type particles afford reduced capability of ion solvation and yield large interparticle insulating void spaces upon packing. Nano-size metal oxyhydroxide-type particles with inherently greater surface areas and capability for ion solvation are desirable to overcome the poor interparticle contacts associated with known materials.

There is a need in the art for new solid-state electrolyte/separator with high innate conductivity and less susceptibility to loss of long-range particle-to-particle ion conduction. Higher ion conductivities can be achieved in the solid-state by employing nano-size metal oxyhydroxide particles that dissolve alkali metal salts, and that can more tightly pack together to maintain contiguous particle-to-particle ion transport.

SUMMARY OF INVENTION

The present invention relates to a unique solid state separator/electrolyte and battery system that employs solid metal oxyhydroxide nano-particles with enhanced, innate single particle conductivity, and smaller size particles for improved interparticle packing for maintaining robust interparticle contacts.

The novel separator electrolyte generally comprises: a metal oxyhydroxide/alkali salt based separator/electrolyte. A preferred embodiment comprises an aluminum oxyhydroxide/lithium iodide based separator/electrolyte. A second preferred embodiment comprises an aluminum oxyhydroxide/lithium salt based separator/electrolyte that does not oxidize below 4.5 volts.

One embodiment of the invented battery system generally comprises: a first electrode, a second electrode and a unique metal-oxyhydroxide-salt based separator/electrolyte (MOHSM) positioned between the first and second electrode.

Another embodiment of the invention relates to a battery system wherein the faces of the MOHSM separator/electrolyte are coated with an ion-conducting polymer creating a laminate-membrane that obviates problems associated with ion transport and polarization at the electrode-separator/electrolyte interface.

DETAILED DESCRIPTION OF THE EMBODIMENTS

Figure 1:
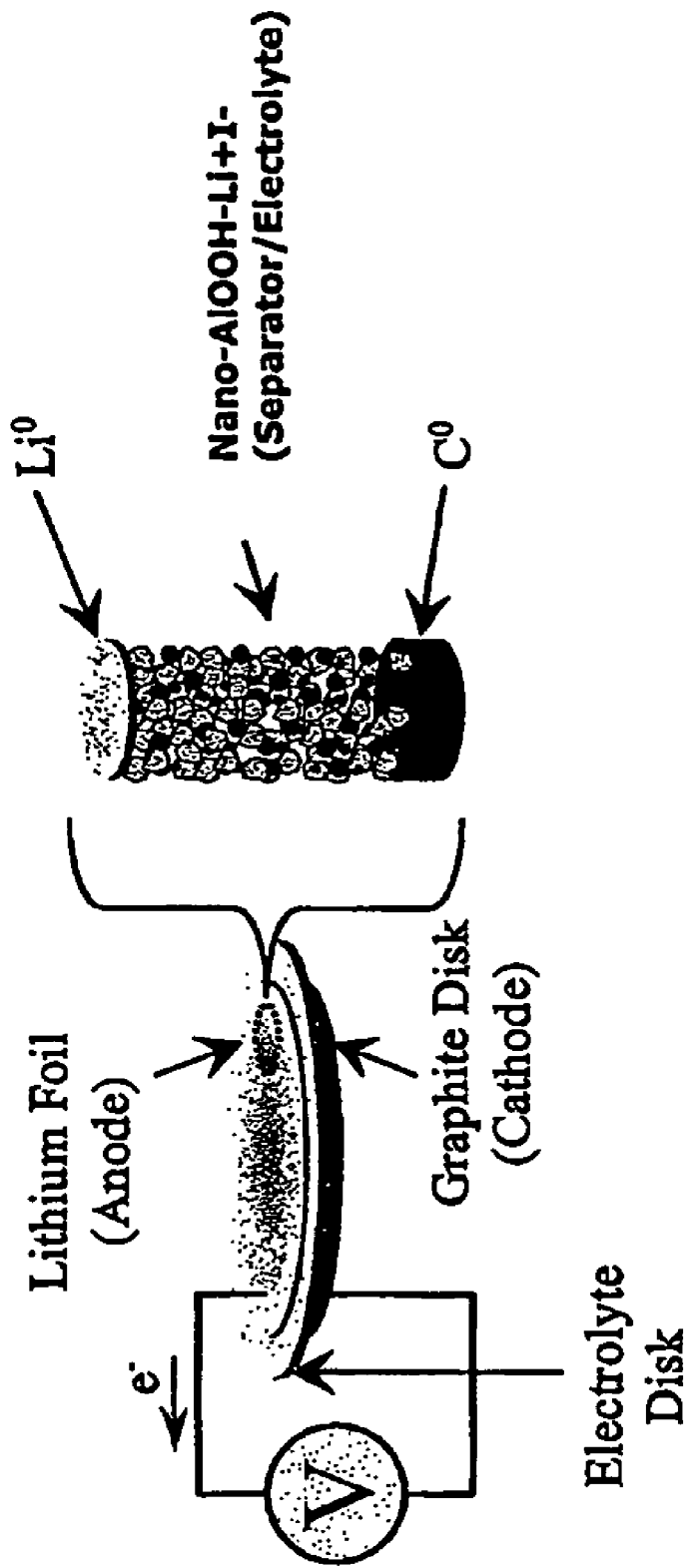
FIG. 1 illustrates one embodiment of the invented battery system having: a carbon cathode, a lithium anode, and a nano-AlOOH—$Li^+I^-$ separator/electrolyte.

The instant invention relates an electrochemical cell and a novel solid-state separator/electrolyte incorporated therein. The invented electrochemical cell generally comprising: a unique metal oxyhydroxide based (i.e. ALOOH) separator/electrolyte membrane sandwiched between, a first electrode, and a second electrode.

Unique Separator/Electrolyte Membrane

A salient feature of at least one embodiment of the present invention is a unique solid state metal oxyhydroxide-salt separator/electrolyte membrane (MOHSM). The MOHSM generally comprises: a metal oxyhydroxide and a salt which are mixed and then pressed together to form a membrane.

Although aluminum oxyhydroxide is the preferred metal oxyhydroxide, a variety of metal oxyhydroxides can be utilized in the MOHSM. Suitable metal oxyhydroxides oxides include but are not limited to: titanium oxyhydroxides, aluminum oxyhydroxide, magnesium oxyhydroxide, silicone oxyhydroxide, vanadium oxyhydroxide, zirconium oxyhydroxide, germanium oxyhydroxide, tin oxyhydroxide, gallium oxyhydroxide, indium oxyhydroxide, iron oxyhydroxide, chromium oxyhydroxide, molybdenum oxyhydroxide, nickel oxyhydroxide, copper oxyhydroxide, zinc oxyhydroxide and combinations thereof. Various metal alloy oxyhydroxides could also be used. Aluminum oxyhydroxide is the most preferred. Suitable morphologies of metal oxyhydroxides include crushed and ground fine powders comprised of sub micron-size particles; nanometer-size particles in the range of about 1-100 nanometers are preferred. The most preferred particle sizes for metal oxyhydroxides include the range from about 1-10 nanometers.

Suitable MOHSM salts include but are not limited to: lithium lauryl sulfate, lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), Lithium bis(oxalato)borate (LiBOB), lithium bistrifluoromethanesulfonyl amide ($LiN(CF_3SO_2)_2$), lithium triflate, $ZnCl$, $AlCl_3$, $AlCl_3.6H_2O$, $Al(NO_3)_3$, $HCl$, $NH_4OH$, $H_2SO_4$, lithium iodide, lithium bromide, lithium chloride, lithium fluoride, NaOH, KOH, LiOH, CsOH, NaCl, KCL, CsCl, $Al_2(SO_4)_3$, and derivatives and combinations thereof.

Preferred salts include: lithium hexafluorophosphate ($LiPF_6$), lithium trifluoromethanesulfonate ($LiCF_3SO_3$), lithium bis(oxalato)borate (LiBOB), lithium bistrifluoromethanesulfonyl amide ($LiN(CF_3SO_2)_2$), lithium triflate, lithium bromide, and lithium iodide.

The chemical composition and conductivity of the MOHSM can be further modified to adjust the conductivity of the membrane (i.e. adding individual anions and cations (i.e. Li ions), mixed metal oxides, etc.).

It is important to note that the monolithic MOHSM acts as both a separator and an electrolyte. The low electronic conductivity of the metal oxyhydroxide provides the electrical insulation feature of an electrode separator; the addition to, and dissolution by the metal oxyhydroxide of a salt provides mobile ions for transport of the electroactive agent (the cation or anion) from one electrode to the other. Thus, the combination, mixture, or dispersion of an insulating metal oxyhydroxide and a soluble salt produces a material that can have dual and simultaneous functions of an electrical separator and an ion conductor.

Preparation of Metal Oxyhydroxide

The metal oxyhydroxide can be prepared using a number of methods known in the art. A preferred method of producing nanoscale AlOOH is described by Markel, et al. (Markel E, Reddick E, Napper L, Van Zee J, Journal of Non-Crystalline Solids 180, 32-39 (1994)) to affect the mercury (II)-mediated auto-oxidation of aluminum to form nanoparticulate and amorphous aluminum oxyhydroxide.

In one exemplary method of preparing AlOOH, a high-purity (99.999%) aluminum metal strip was immersed at room temperature into a 2 M nitric acid solution containing 0.001 M mercury (II) ions. (To make the solution, 50.15 mg of mercury metal was dissolved in 31.25 ml of concentrated nitric acid and diluted to 250 ml with de-ionized water.) After approximately 20 minute a mirror-like surface was observed on the aluminum; the aluminum metal strip was removed from the acid solution and rinsed with de-ionized water. On exposure to humid room-temperature air, the mercury-treated aluminum metal strip auto-oxidized to form thin white fibers of aluminum oxyhydroxide; the reaction was completed after several hours.

The relative humidity should generally be between about 50-100%, preferably between about 70-90%. The nanoparticulate aluminum oxyhydroxide fibers were stored in a dry nitrogen box.

A 60 mg sample of nanoparticulate aluminum oxyhydroxide was placed in a glass tube and degassed under vacuum at 350° C. for 5 hours. The sample was maintained under vacuum for an additional 15 hours at a reduced temperature of 200° C. The BET surface area of the nanoparticulate aluminum oxyhydroxide was subsequently measured and found to be 260 $m^2/g$. The final weight of the white nanoparticulate aluminum oxyhydroxide was 36 mg.

As discussed below adding a calcination step can covert the metal oxyhydroxide to a metal oxide.

Preparation of Metal Oxyhydroxide Separator/Electrolyte (MOHSM)

The unique MOHSM is generally produced by:
1. preparing or providing nanoparticulate metal oxyhydroxide (preferably AlOOH);
2. mixing the metal oxyhydroxide with a salt, forming a metal oxyhydroxide salt mixture (NSM);
3. (optional) grinding the NSM to a fine powder; and
4. pressing the NSM into a MOHSM membrane.

The metal oxyhydroxide (i.e. AlOOH) can be prepared as previously discussed and then mixed with salt (i.e. LiI), preferably in a dry box. The mixture is preferably ground forming a fine powder mixture. The salt can be pre-ground before being mixed with the metal oxyhydroxide. The mixture can be ground using a number of techniques well known in the art including but not limited to: hand and machine grinding. Alternate processes for intimately mixing metal oxyhydroxide and salt include forming a slurry of a metal oxyhydroxide in a salt solution, followed by casting the slurry on a flat surface and evaporation of the solvent. Suitable solvents include polar, aprotic liquids that dissolve salts, including acetonitrile, acetone, diethyl ether, etc The metal oxyhydroxide-salt mixture can be pressed using a number of techniques and apparatuses known in the art. The mixture should be pressed using a force sufficient to bind the particles within the NSM together to form a monolithic membrane. A suitable force is ~5,000 psi, preferably about ~10,000 psi. Preferably, the NSM is pressed in a die press using a series of progressively higher pressing steps as described below. Application of heat and vacuum to the metal oxyhydroxide-salt powder mixture may also be advantageous for producing a homogenous, well-formed, and uniform MOHSM.

A salient aspect of the invention is the concentration of metal oxyhydroxide within the NSM. A suitable metal oxyhydroxide concentration is about 40-70 mol. % of the NSM, more preferably between about 45-55 mol. %. Preferably the mol. ratio between the metal oxyhydroxide and the salt is between about 2:1 and 1:2.

Figure 10:
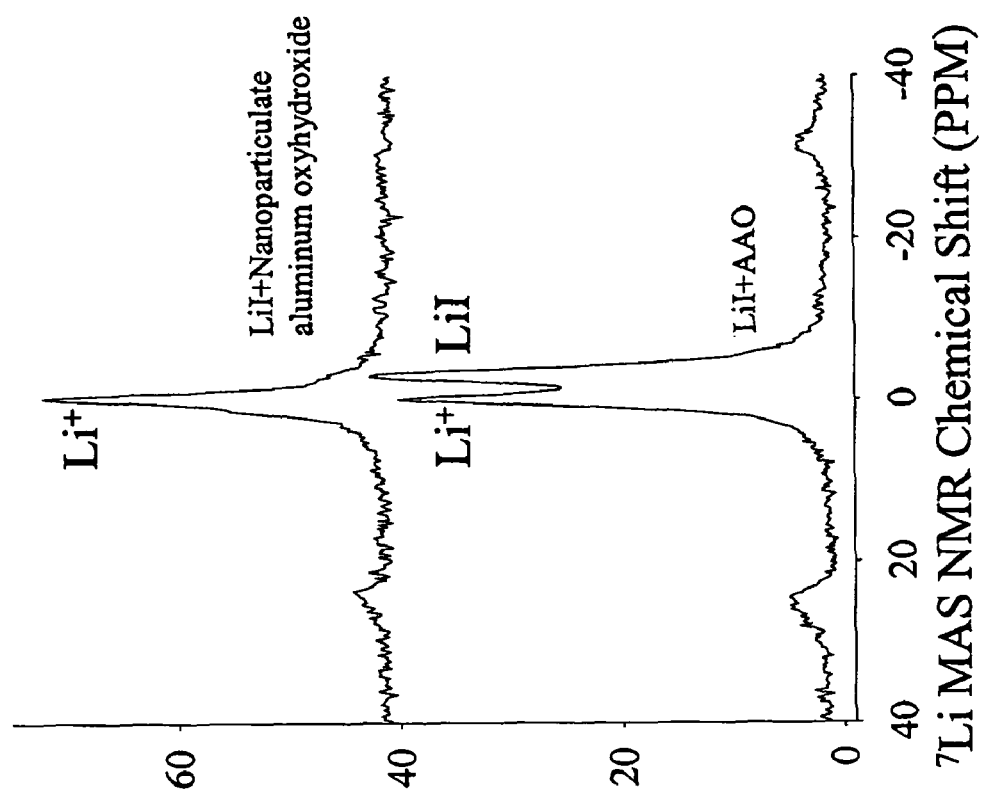
FIG. 10 illustrates a comparison of ⁷Li MAS NMR spectra of nanoparticulate aluminum oxyhydroxide/lithium iodide (produced using the invented method) and monolithic anodized aluminum oxide (AAO)/lithium iodide separator/electrolyte materials. The monolithic AAO contains some AlOOH. The aluminum oxide interacts with lithium iodide to produce highly mobile Li⁺ ions, which show a ⁷Li-NMR resonance at 0 ppm. Lithium iodide salt crystallites show a ⁷Li-NMR resonance at approximately −2.5 ppm. The monolithic anodized aluminum oxide/lithium iodide system shows that approximately 50% of lithium is ionic and highly mobile, and therefore useful for ion transport in an electrochemical cell. Nanoparticulate aluminum oxide produced by the Hg-mediated oxidation of aluminum metal, yielded nearly 100% highly mobile lithium ions.
Figure 11:
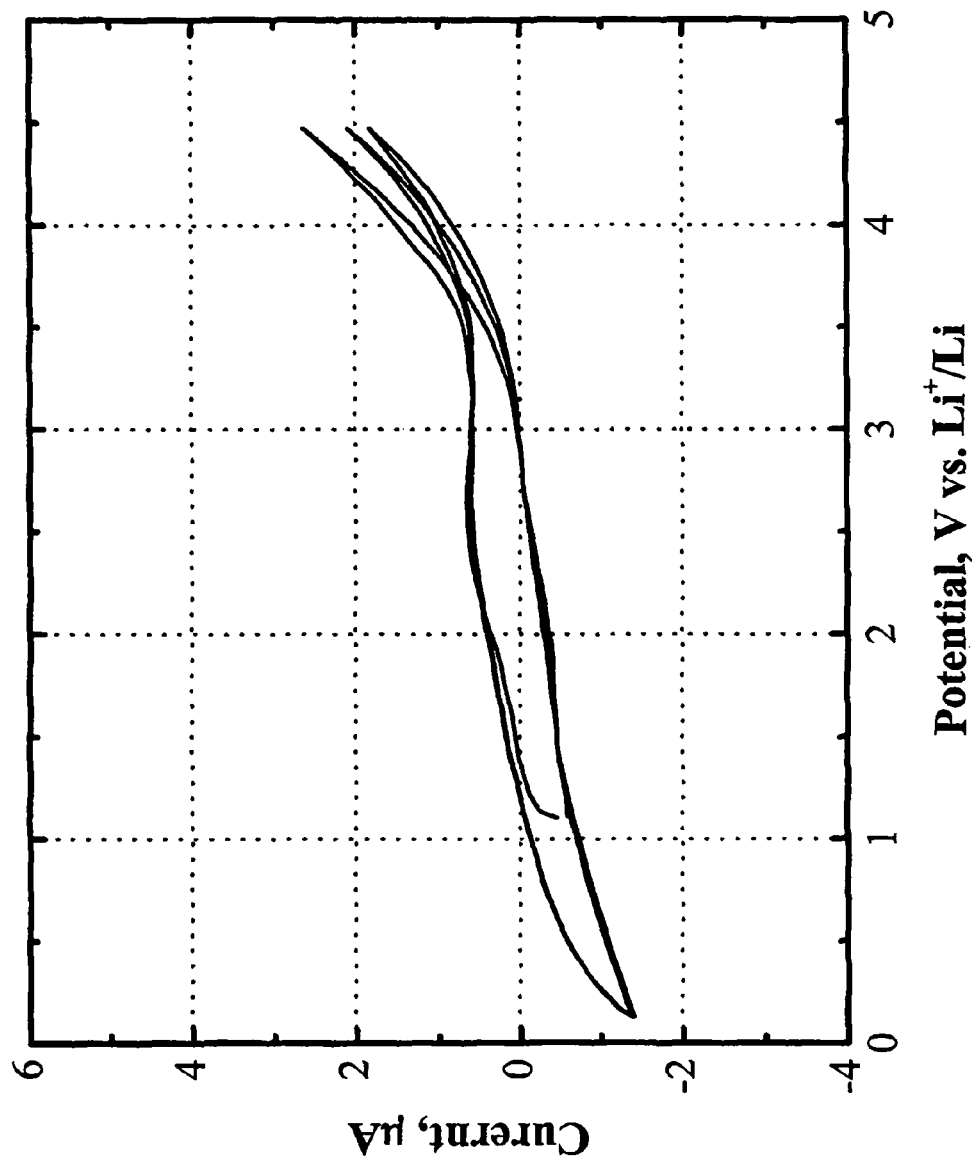
FIG. 11. is a graph of potential v. current for the invented separator/electrolyte FIG. 12. is an alternate embodiment of the invention incorporating a polymer electrolyte laminate.

In an exemplary preparation, a 129.8 mg sample of nanoparticulate aluminum oxy-hydroxide (prepared as discussed above) was combined with 136.5 mg of LiI and ground to a fine powder mixture in a dry nitrogen box using a mortar and pestle. The solid-state electrolyte mixture was 55.51 mole % aluminum oxyhydroxide. Analysis by $^7Li$ NMR revealed that most of the lithium in the solid-state electrolyte was ionic and therefore available for ionic conduction (see FIG. 10).

A portion of this sample was placed in a 13 mm-diameter stainless-steel die and compressed at room temperature as follows: the solid-state electrolyte was first compressed slowly to 5,000 psi; then the pressure was released; second, the pellet was slowly compressed to 10,000 psi; then the pressure was released; third, the pellet was repeatedly compressed to 13,000 psi and the pressure released. The pellet was removed from the die in a dry-nitrogen box.

In an alternate embodiment, an electrode material is placed in the bottom of the die press and the NSM mixture placed on top of the electrode material. This allows the electrode material and electrolyte/separator to be pressed together. This process also allows a portion of the electrolyte material to intercalate within the electrode. Certain electrode compositions (e.g., $PbI_2$) do not contain mobile cations resulting in local cation reduction during cell operation. For example, in a $PbI_2$ electrode this means that only lead cations near the $PbI_2$ electrode-LiI(AlOOH) electrolyte interface will undergo electrochemical reduction, and proceed as an electrochemical reaction plane wave. An electrochemical reaction plane wave severely limits the rate of energy delivery by a battery. The bulk of the $PbI_2$ electrode that is physically removed from the electrolyte will remain inactive, and thus the capacity of the cell for producing energy will be severely limited. In this example, the electrochemical reaction also produces additional LiI at the $Pb^{+2}$ sites because when the $Pb^{+2}$ cations are reduced, the mobile iodine anions combine with local mobile lithium cations. Dispersed, interconnected LiI—AlOOH electrolyte throughout the $PbI_2$ electrode material allows the electrochemical reduction of $Pb^{+2}$ to be initiated throughout the total volume occupied by the $PbI_2$ electrode material. Once the electrochemical reduction of $Pb^{+2}$ is initiated, local formation of LiI allows the electrochemical process to continue and expand spatially about the initiation points. A second electrode material that requires interspersed electrolyte can be placed on top of the NSM, allowing both electrodes and the MOHSM to be simultaneously interspersed and pressed together. Mixing electrolyte materials with electrode materials prior to pressing together to form cell assemblies is a common practice and is know in the art of solid-state battery fabrication.

AlOOH-Salt Performance

Figure 5:
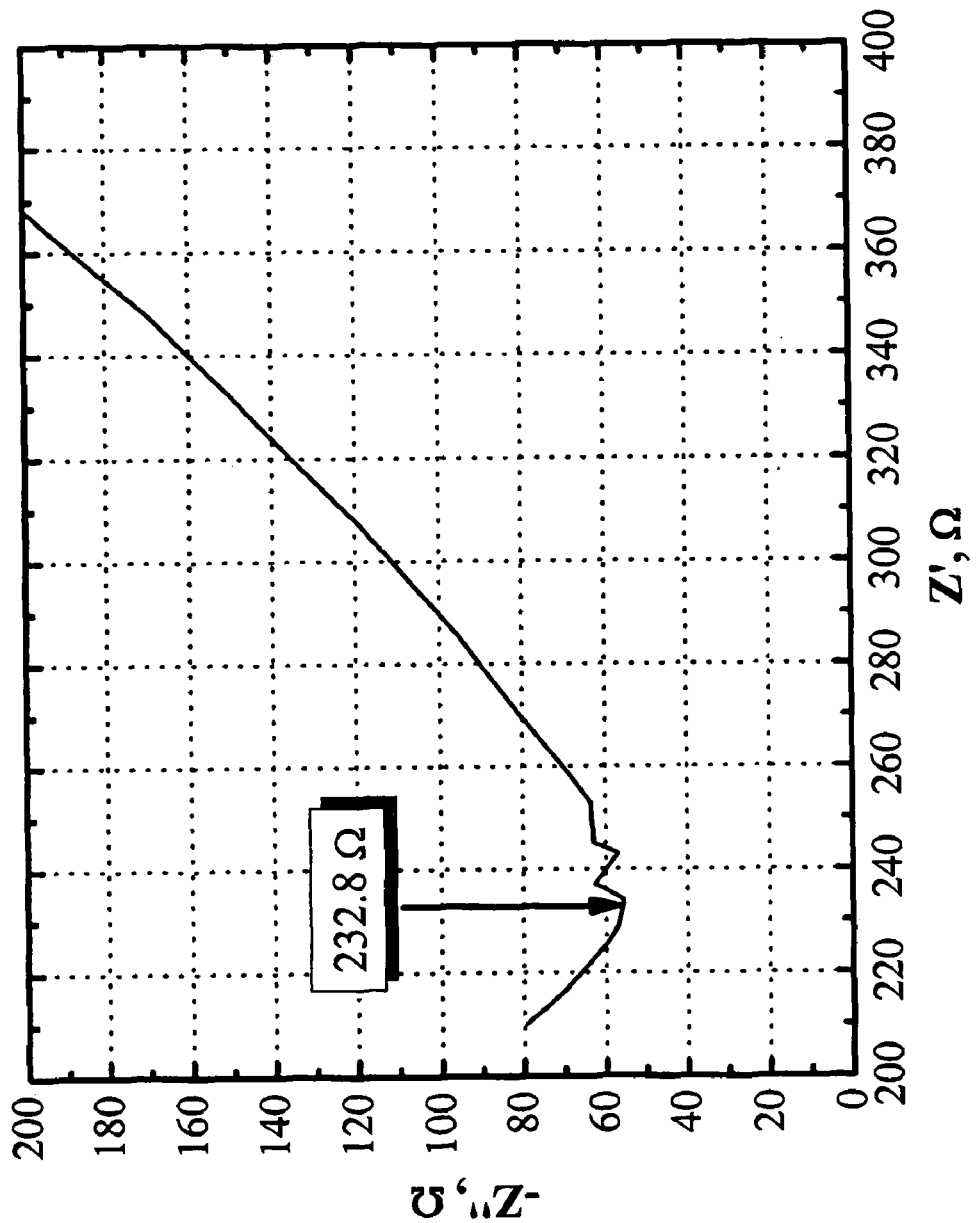
Figure 6:
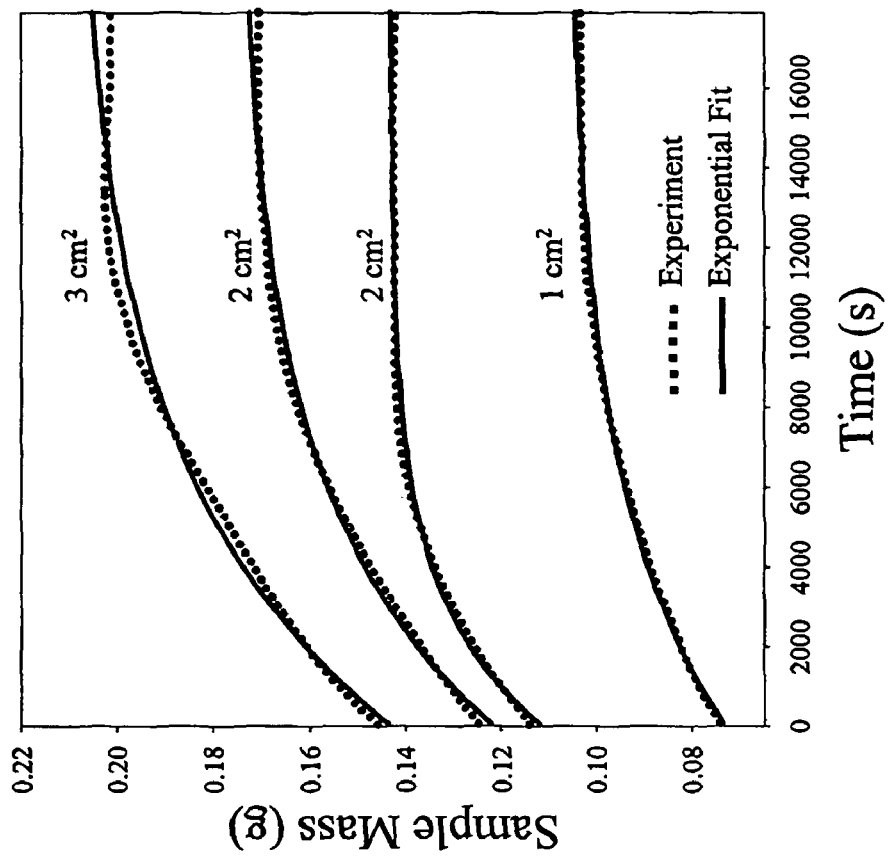
FIG. 6 A graph showing the increase in mass of nanoparticulate aluminum oxyhydroxide aerogel vs. time during the auto-oxidation of aluminum metal in humid air. Measured mass vs. time curves for several aluminum metal samples of different surface areas are shown. The data for each sample follows a mono-exponential time-curve FIG. 7 In situ FTIR spectra showing the dehydration and thermal conversion process of nanoparticulate aluminum oxyhydroxide to nanoparticulate aluminum oxide, recorded over the temperature range 300-950 K under an atmosphere of nitrogen gas.
Figure 7:
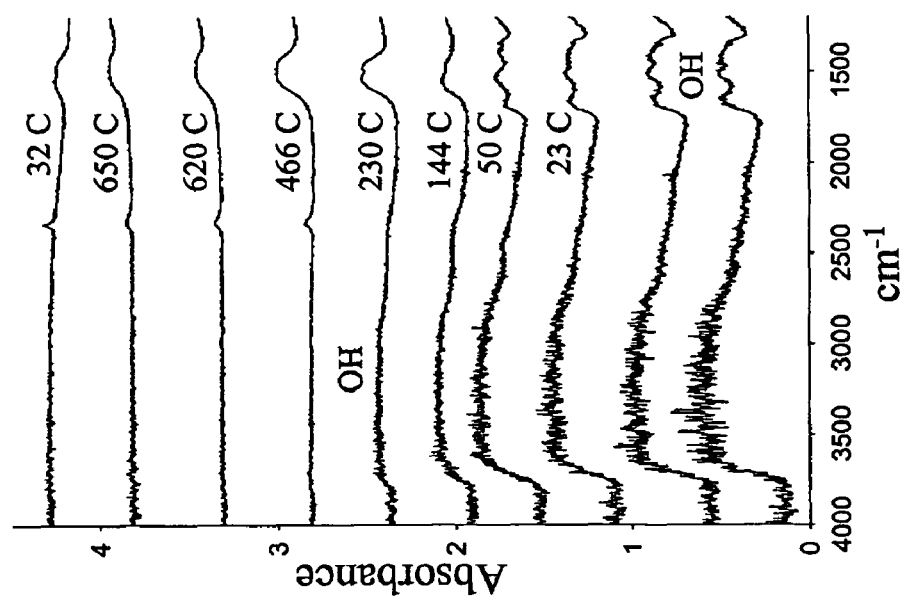
Figure 9:
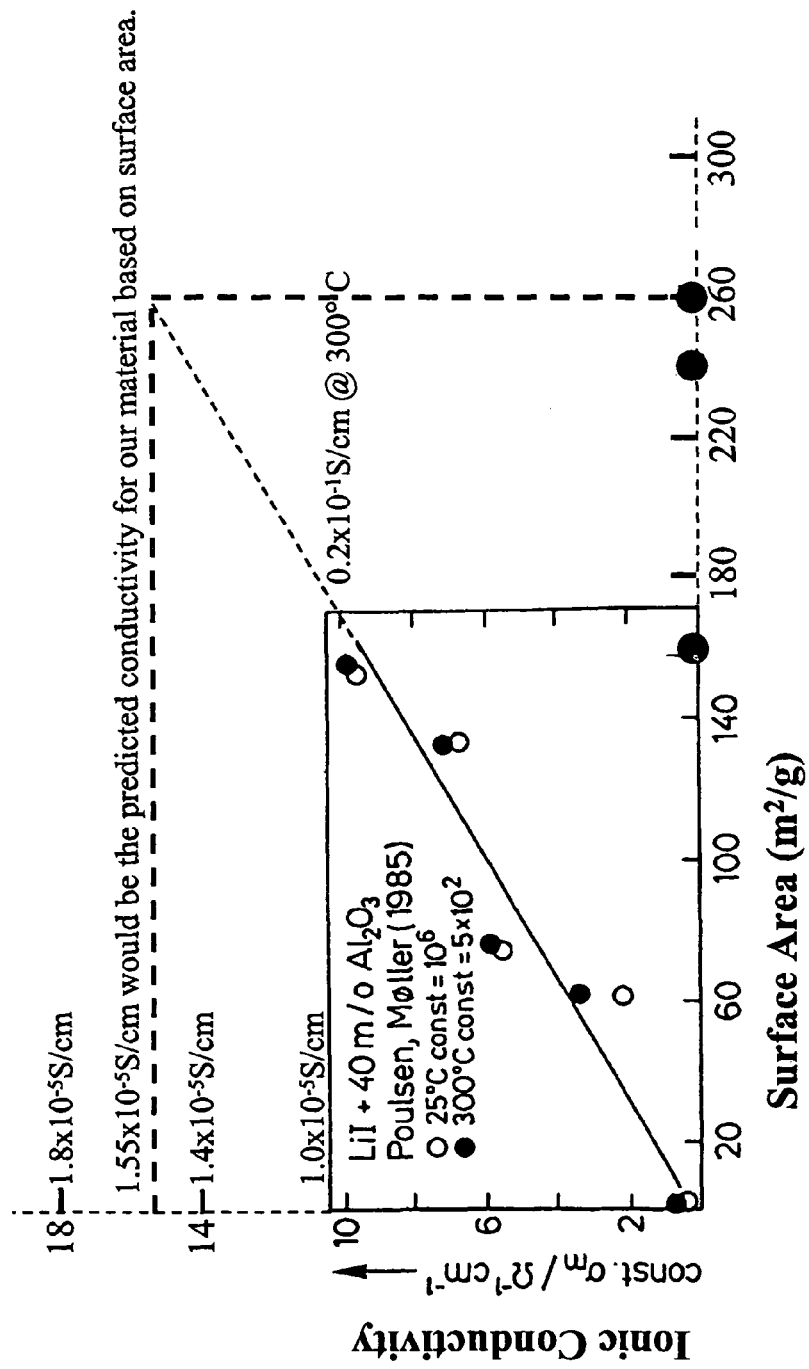
FIG. 9 A graph of ion conductivity at 25 C and 300 C versus particle surface area for a Al2O3/LiI separator/electrolyte. Large black dots represent surface areas for AlOOH and Al2O3 materials of the present invention.

The nanoparticulate AlOOH demonstrated extraordinary and unexpected performance properties. The conductivity of the solid-state electrolyte at room temperature was 0.1 mS/cm (see conductivity graph FIG. 5). The conductivity of the nanoparticulate AlOOH (formed using the present method) was more than six times greater than that which would be predicted by the Poulsen and Møller graph shown in FIG. 9. The Poulsen and Møller graph gives a plot of the generally accepted relationship between surface area and overall conductivity for aluminum oxide. For example, an aluminum oxide particle having an area of 260 $m^2/g$ would be predicted to have a conductivity of about $1.55 \times 10^{-5}$/cm, but the AlOOH-salt (AlOOH 55.1 mol % and LiI 44.9 mol %) of the present invention was shown to have a value of about $9.5 \times 10^{-5}$/cm, which is totally unexpected and illustrates the unpredicated promise of nanoparticulate AlOOH.

Figure 12:
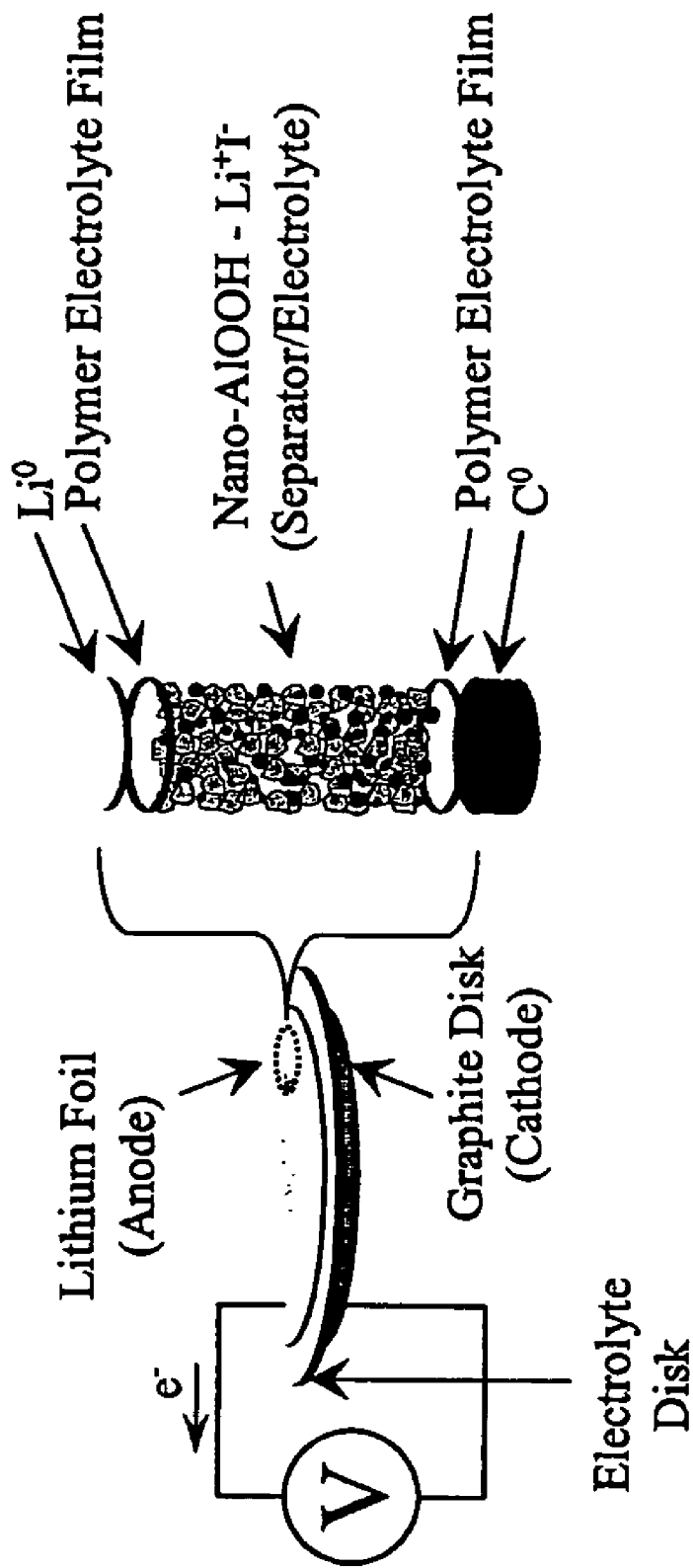

A second pellet of the AlOOH was formed and examined by cyclic voltammetry. The solid-state electrolyte was stable up to an oxidation voltage of about 3.5 volts versus lithium metal (see FIG. 12 showing cyclic voltammogram).

AlOOH-Polymer MOHSM

In another embodiment, the MOHSM membrane comprises: a mixture of a metal oxyhydroxide with an ion-conductive polymer, creating a AlOOH-polymer membrane.

Suitable polymers include but are not limited to: polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer, polyethylene oxide), polypropylene oxide), polyethylene glycols, polypropylene glycols, propylene carbonate, ethylene carbonate, dioctyl sebacate, diethyl phthalate, and derivatives of these polymers and combinations thereof.

The polymer material can be mixed with the metal oxyhydroxide in a variety of ways including but not limited to: physical mixing, forming slurries and casting films, and mixing at temperatures above the melting point of the polymer material.

The polymer limits anion movement which helps increase the efficiency of lithium ion conduction within the MOHSM. The polymer also acts as contact glue, which helps bind the MOHSM together and prevents the membrane from breaking apart. In addition, including polymeric materials in the composition of the MOHSM provides expanded rheology properties such as flexibility, impact and fracture resistance, and chemical features such as hydrophobicity.

Laminated Membrane

In another preferred embodiment the top and bottom faces of the MOHSM are coated with an ion-conducting polymer. This laminated membrane allows fast ion conduction through the AlOOH portion of the MOHSM membrane and allows enhanced contact connection between the membrane and electrodes when the membrane is used in a battery. A thin layer of soft polymer coating on the faces of the membrane creates a bridging effect between the hard and uneven interfacial surfaces of the electrodes and the MOHSM. This very thin polymer layer improves the conductivity of the electrolyte/electrode interface and obviates problems associated with polarization effects that are typically observed in thicker layers. Furthermore, the laminated membrane overcomes many problems associated with previous very thin all-polymer membranes including breach of the polymer membrane separator which can cause unsafe conditions in all-polymer membranes but which would be protected by the membrane in the present embodiment. Thickness of the polymer coating ranges from about 1 nm to about 10 µm. The preferred thickness is determined by the surface roughness of the electrode and AlOOH membrane. Smoother surfaces might only require a coating of about 1 µm or less; layers with 20-100 nm thickness are preferred. Rough surfaces require up to a about 10 µm thick (or even thicker) coatings. This represents an improvement over existing solid-state polymer electrolytes because in this application the polymer electrolyte film can be made much thinner. Thin films mitigate the polarization problem due to the sub-micron thickness of the films.

Conventional polymer electrolyte films are limited by the polarization effect. It is desirable to make these films as thin as possible, preferably less than about 10 µm. However, thin films were shown to be unsafe in the prior art due to short circuit safety concerns (e.g., interelectrode or dendrite contact via electrolyte puncture). Thus, thicker polymer electrolyte films are required to prevent internal short circuit due to the roughness of the electrode surfaces. In the present application, a very thin film of polymer electrolyte can be employed with out short circuit hazards because the AlOOH-based MOHSM separator/electrolyte is located between the electrodes, preventing internal shorting.

The polymer electrolyte can be a variety of polymer materials and can be deposited using a variety of techniques some of which have been discussed earlier in the polymer-metal oxyhydroxide hybrid embodiment. It should be noted that the polymer electrolyte laminate is added to an active membrane, the active membrane being described above.

Separator/Electrolyte Example I

ALOOH—LiI

A 129.8 mg sample of nanoparticulate aluminum oxyhydroxide (prepared as discussed above) was combined with 136.5 mg of LiI and ground to a fine powder mixture in a dry nitrogen box using a mortar and pestle. The solid-state electrolyte mixture was 55.51 mole % aluminum oxyhydroxide.

A portion of this sample was placed in a 13 mm-diameter stainless-steel die and compressed at room temperature as follows: the solid-state electrolyte was first compressed slowly to 5,000 psi; then the pressure was released; second, the pellet was slowly compressed to 10,000 psi; then the pressure was released; third, the pellet was repeatedly compressed to 13,000 psi and the pressure released. The pellet was removed from the die in a dry-nitrogen box. The solid-state electrolyte pellet was contacted by a carbon tape disk on each face and placed between two stainless-steel electrodes. AC impedance measurements were performed on the pellet that showed a conductivity of approximately 0.1 mS/cm at room temperature.

Separator/Electrolyte Example II

AlOOH—LiBr

A sample of nanoparticulate aluminum oxyhydroxide (prepared as discussed above) is combined with LiBr in a molar ratio of about 1:1 and ground to a fine powder mixture in a dry nitrogen box using a mortar and pestle. A portion of this sample is then placed in a 13 mm-diameter stainless-steel die and compressed at room temperature as follows: the solid-state electrolyte is first compressed slowly to 5,000 psi; then the pressure is released; second, the pellet is slowly compressed to 10,000 psi; then the pressure is released; third, the pellet is repeatedly compressed to 13,000 psi and the pressure released. The pellet is removed from the die in a dry-nitrogen box.

Membrane Example IV

AlOOH-Laminate Membrane

The AlOOH-salt membrane is prepared as taught and is then cooled and transferred to a nitrogen atmosphere and heated on a hot plate to 400 K. A PEO/Li-triflate polymer electrolyte is smeared onto the surface of the membrane and excess electrolyte is scraped off using a knife edge. The MOHSM membrane is turned over and the procedure is repeated. Both surfaces of the MOHSM are slightly tacky and easily adhere to the surfaces of electrodes. A piece of lithium foil (anode) is contacted to the top surface of the laminate MOHSM membrane and a graphite carbon electrode (cathode) is similarly contacted to the bottom surface.

Electrodes

A separator/electrolyte, as described above, is paired with a suitable first and second electrode to form a functional electrochemical cell.

The first and second electrode materials are placed one either side of the MOHSM. The electrodes can be made of a variety of materials known in the art, or the corresponding alkali or alkaline ion materials including but not limited to: $MoO_3$, $Cr_3O_8$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, $TiO_2$, $TiS_2$, $MoS_2$, $NiPS_3$, $TiSe_3$, $TiTe_2$, $MoS_2$, $MoSe_2$, InSe; coke, graphite, aluminum, CFn, $(C_2F)_n$, $C_7CoCl_2$, poly(acetylene), poly(pyrrole), poly(vinylferrocene), poly(aniline), poly(p-phenylene), poly(phenylene sulfide).

The electrode materials can be attached to the MOHSM using a variety of methods well known in the art including but not limited to various adhesives, coupling devices or other materials. The electrodes may also be attached using methods known in the art including but not limited to melting the electrode materials onto the faces of the MOHSM membrane or pressing the electrodes onto/into the MOHSM as previously described.

The electrode materials should be selected to correspond with the materials of the MOHSM so as to form a functional electrochemical cell system.

Exemplary Nano-Battery Systems

FIG. 1 illustrates one embodiment of the invented battery system having: a carbon cathode, a lithium anode, and a nano-AlOOH—$Li^+I^-$ separator/electrolyte.

Figure 2:
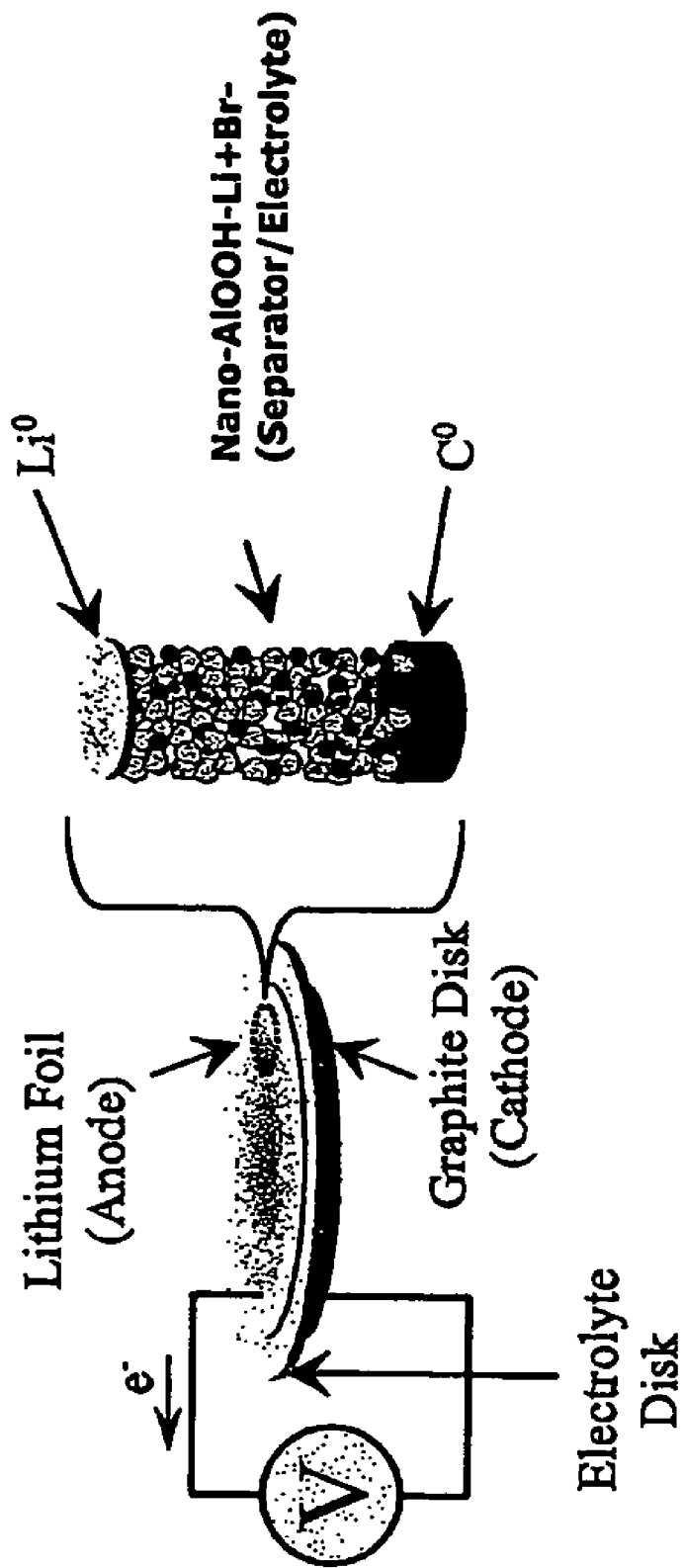
FIG. 2 illustrates another embodiment of the invented battery system having: a carbon cathode, a lithium anode, and a nano-AlOOH—$Li^+Br^-$ separator/electrolyte.

FIG. 2 illustrates another embodiment of the invented battery system having: a carbon cathode, a lithium anode, and a nano-AlOOH—$Li^+Br^-$ separator/electrolyte.

Figure 3:
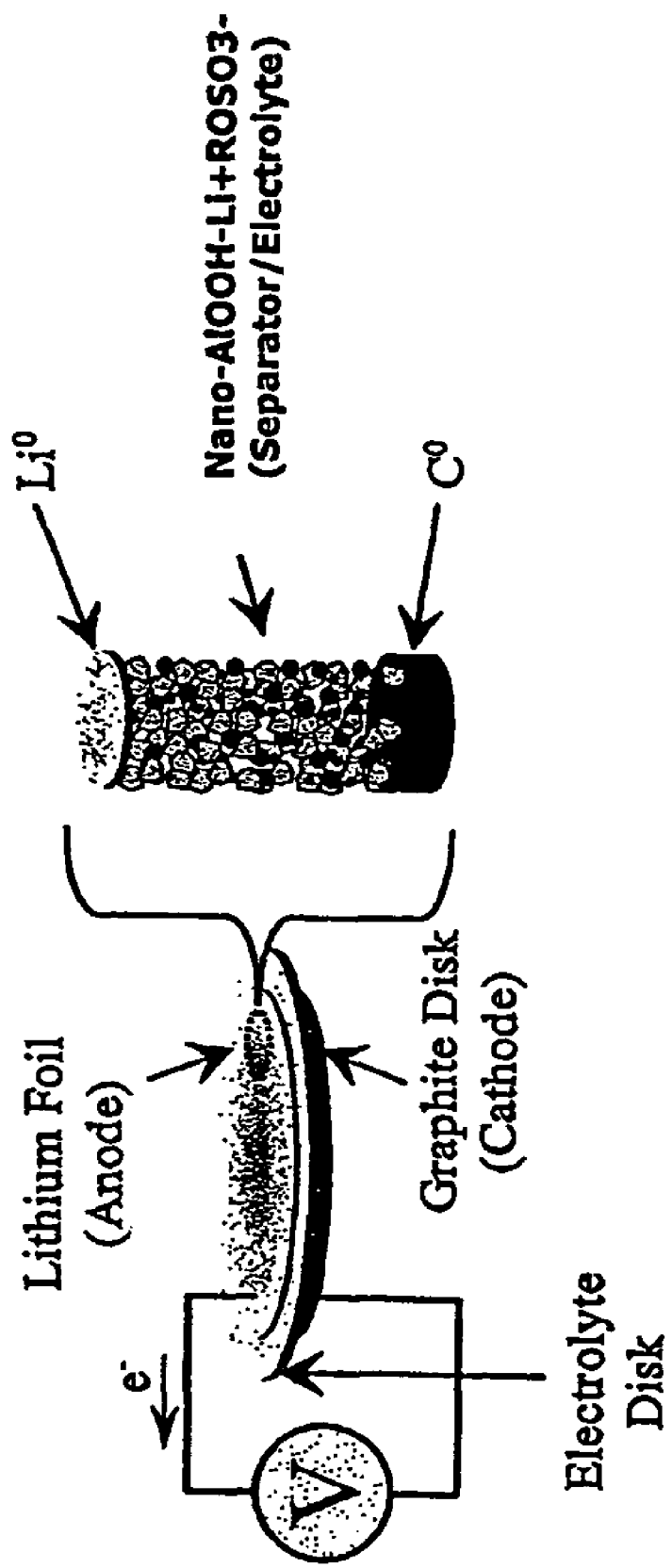
FIG. 3 illustrates another embodiment of the invented battery system having: a carbon cathode, a lithium anode, and a nano-AlOOH—Li+ROSO3⁻ separator/electrolyte

FIG. 3 illustrates another embodiment of the invented battery system having: a carbon cathode, a lithium anode, and a nano-AlOOH—$Li^+ROSO_3^-$ separator/electrolyte.

Figure 4:
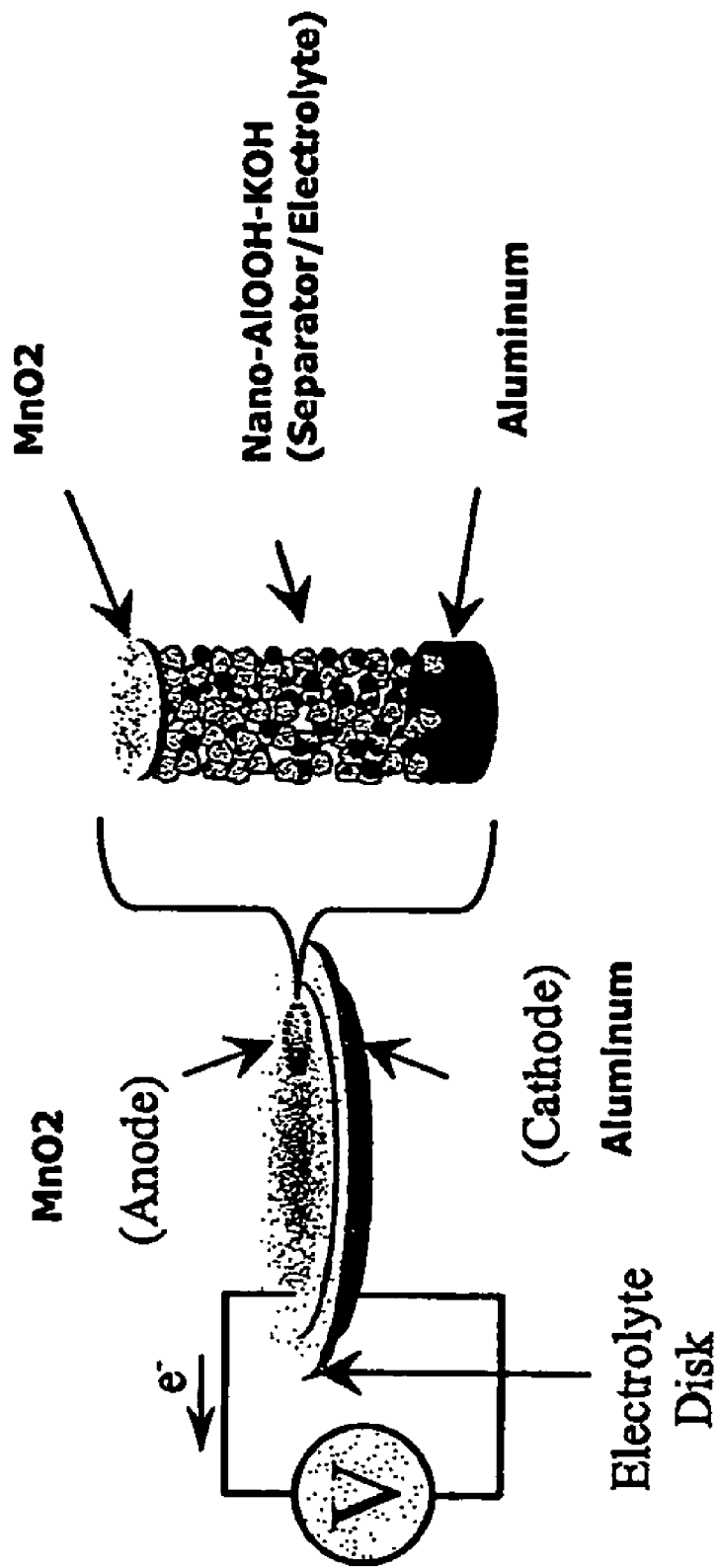
FIG. 4 illustrates yet another embodiment of the invented battery system having: a $MnO_2$ cathode, an aluminum anode, and a nano-AlOOH—KOH separator/electrolyte FIG. 5. illustrates an AC impedance plot for a nano-AlOOH—Li⁺I⁻ separator/electrolyte (AlOOH 55.1 mol % and LiI 44.9 mol %).

FIG. 4 illustrates yet another embodiment of the invented battery system having: a $MnO_2$ cathode, an aluminum anode, and a nano-AlOOH—$K^+OH^-$ separator/electrolyte.

FIG. 12 illustrates another embodiment of the invented battery system having: a carbon cathode, a lithium anode, a nano-AlOOH—$Li^+I^-$ separator/electrolyte with a polymer electrolyte coating on the top and bottom faces.

Production of Nanoscale $Al_2O_3$ Having Extremely High Conductivities

It was discovered that one could cost effectively produce nanoscale $Al_2O_3$ particles having sizes less than about 10-15 nanometers using the mercury assisted auto-oxidation of aluminum described above followed by one or more calcinations steps.

$Al_2O_3$ materials prepared using this method exhibit surprising and unexpected conductivities. An electrochemical cell incorporating a solid-state electrolyte made from nanoparticulate aluminum oxide derived from aluminum oxyhydroxide was fabricated according to the following procedure: The nanoparticulate aluminum oxyhydroxide fibers, obtained from the auto-oxidation of aluminum described previously, were converted to nanoparticulate aluminum oxide by heating in air at 600° C. for one hour.

Figure 8:
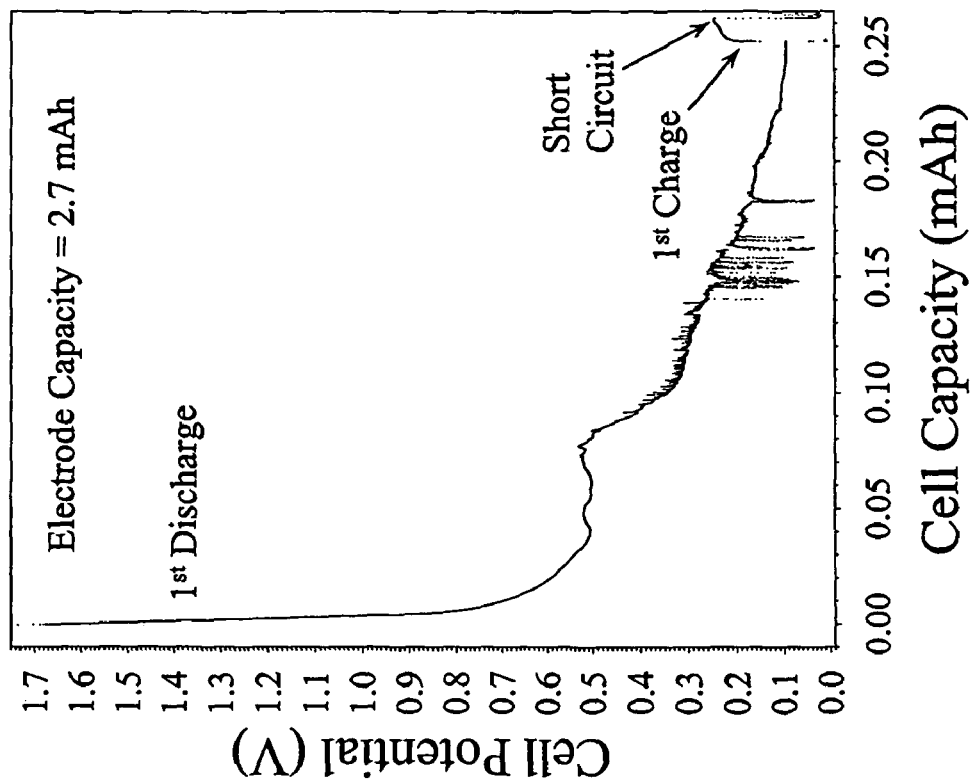
FIG. 8. The room-temperature potential vs. capacity curve for the first discharge/charge cycle of the electrochemical cell employing a solid-state separator/electrolyte composed of heat-treated AlOOH mixed with LiI. Lithium metal and graphite carbon were used as the anode and cathode, respectively. The intercalation of lithium into the surface particles of the graphite electrode was reversed after lithium loading to ten percent of the cathode's capacity. During the initial stage of the cell charge cycle a short circuit occurred, and cell cycling was terminated. Cell discharge and charge proceeded at 0.01 mA and 0.005 mA rates, respectively. The geometrical size of the graphite electrode was a %16"-diameter disk. (Since, the AlOOH was heated to 600 C, it has a mixed composition of AlOOH and Al2O3; the term "heat-treated" AlOOH makes a distinction from as-synthesized AlOOH.)

The white fibers collapsed to a white powder, which was allowed to cool in a dry nitrogen box. 400.2 mg of nanoparticulate aluminum oxide was mixed with 642.1 mg of LiI in a dry nitrogen box and ground with a mortar and pestle. The sample was 45 mole % nanoparticulate aluminum oxide. The yellowish powder was pressed onto a graphite-coated electrode using 10,000 psi of static pressure. A pressure burst of 10,000 psi was applied at least five times causing an electrolyte disk to form and impregnate into the graphite-coated electrode. A disk of lithium metal was placed above the solid-state electrolyte disk, and the assembly was hermetically sealed in a test cell. The capacity of the graphite electrode for lithium intercalation was 2.7 mAh. The lithium metal disk (excess lithium equivalents) was mechanically compressed onto the solid-state electrolyte disk by the test cell, and served as the second electrode of the cell. The room-temperature potential vs. capacity curve for the first discharge/charge cycle of the cell demonstrates the transport of lithium by the solid-state electrolyte (see discharge curve FIG. 8). The intercalation of lithium into the surface particles of the graphite-coated electrode was reversed after lithium loading to ten percent of the electrode's capacity. During the initial stage of the cell charge cycle a short circuit occurred, and cell cycling was terminated. Cell discharge and charge proceeded at 0.01 mA and 0.005 mA rates, respectively. The diameter of the graphite-coated electrode was 1.4288 cm.

Thus a nanoparticulate comprising both AlOOH and aluminum oxide can be produced when the AlOOH produced using the described invention is heated at about 600° C. or above for a period of time (i.e. before all of the AlOOH is converted to aluminum oxide)

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

We claim the following:

1. A battery system incorporating a separator/electrolyte comprising: a first and second electrode, and
    a metal oxyhydroxide-salt separator/electrolyte membrane (MOHSM) having a first and second face, positioned between the first and second electrodes.

2. The battery system of claim 1, wherein the first electrode is attached to the first face of the MOHSM and the second electrode is attached to the second face of the MOHSM.

3. The battery system of claim 1, wherein the MOHSM comprises a metal oxyhydroxide and a salt.

4. The battery system of claim 3, wherein the metal oxyhydroxide is selected from the group consisting of: titanium oxyhydroxides, aluminum oxyhydroxide, $AlOOH \cdot aH_2O$ wherein $0 \leq a \leq 2$, magnesium oxyhydroxide, silicone oxyhydroxide, vanadium oxyhydroxide, zirconium oxyhydroxide, germanium oxyhydroxide, tin oxyhydroxide, gallium oxyhydroxide, indium oxyhydroxide, iron oxyhydroxide, chromium oxyhydroxide, molybdenum oxyhydroxide, nickel oxyhydroxide, copper oxyhydroxide, zinc oxyhydroxide and combinations thereof.

5. The battery system of claim 3, wherein the metal oxyhydroxide comprises aluminum oxyhydroxide.

6. The battery system of claim 5, wherein the first and second electrodes are constructed of a materials selected from the group consisting of: $MoO_3$, $Cr_3O_8$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, $TiO_2$, $TiS_2$, $MoS_2$, $NiPS_3$, $TiSe_3$, $TiTe_3$, $MoS_2$, $MoSe_2$, InSe; coke, graphite, aluminum, $CF_n$, $(C_2F)_n$, $C_7CoCl_2$, AgI, $PbI_2$, $CuI_2$, poly(acetylene), poly(pyrrole), poly(vinylferrocene), poly(aniline), poly(p-phenylene), poly(phenylene sulfide) and combinations thereof.

7. The battery system of claim 5, wherein the first electrode is lithium and the second electrode is carbon or aluminum.

8. The battery system of claim 5, wherein the first electrode is $MnO_2$ and the second electrode is aluminum.

9. The battery system of claim 5, wherein the salt is selected from the group consisting of: lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), and lithium bistrifluoromethanesulfonyl amide ($LiN(CF_3SO_2)_2$), lithium bis(oxalato)borate (LiBOB), and lithium triflate.

10. The battery system of claim 5, wherein the salt is selected from the group consisting of: lithium iodide, lithium bromide, lithium chloride, lithium fluoride, NaOH, KOH, LiOH, CsOH, NaCl, KCl, CsCl, $Al_2(SO_4)_3$, and derivatives and combinations thereof.

11. The battery system of claim 5, wherein an ion-conducting polymer laminate is deposited upon the first and second faces of the MOHSM.

12. The battery system of claim 11, wherein the polymer electrolyte laminate comprises a polymer selected from the group consisting of: polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer, poly(ethylene oxide), poly(propylene oxide), polyethylene glycols, polypropylene glycols, propylene carbonate, ethylene carbonate, dioctyl sebacate, diethyl phthalate, derivatives of these polymers and combinations thereof.

13. The battery system of claim 3, wherein the molar ratio of the metal oxyhydroxide to salt in the MOHSM is between about 2:1 and 1:2.

14. The battery system of claim 3, wherein the metal oxyhydroxide concentration is between about 40-70 mol. % of the MOHSM.

* * * * *